March 7, 1961    F. SPRAGUE    2,973,782
SEQUENCE CONTROLLER FOR VALVES
Filed April 22, 1955

INVENTOR.
FRANK SPRAGUE
BY
Eugene C. Knoblock
ATTORNEY

United States Patent Office 2,973,782
Patented Mar. 7, 1961

2,973,782

SEQUENCE CONTROLLER FOR VALVES

Frank Sprague, % Sprague Devices, Michigan City, Ind.

Filed Apr. 22, 1955, Ser. No. 503,271

4 Claims. (Cl. 137—627.5)

This invention relates to a sequence controller for valves, and more particularly to a controller adapted to control a plurality of valves in a predetermined sequence and relationship.

The primary object of this invention is to provide a novel, simple and inexpensive device which is trouble-free in operation and which is usable for the purpose of controlling the relationship between two or more valves and the sequence at which each operates and the rate of opening and closing of each valve according to a predetermined pattern.

A further object is to provide a device of this character having a single controller which is operable to regulate the rate of flow in several paths, to shut off flow completely, to select flow in one or more paths, and to regulate the total rate of flow where liquid is to be directed in several paths, or where higher or lower operating pressures are required in a flow system.

A further object is to provide a device of this character which employs line pressure from the pressure source to assist in sealing the valve in its off position.

A further object is to provide a device of this character which is particularly well suited for use with air-operated windshield wipers having air-operated means for controlling the "parked" position of the blade when the motor is deenergized, wherein the operation of the device will control the full range of speed and power of the windshield wiper and will control the operation of the "parking" means when the primary motor is stopped and in which diverting of pressure to effect parking is done in a manner to relieve pressure from the motor.

Other objects will be apparent from the following specification.

Figure 1:
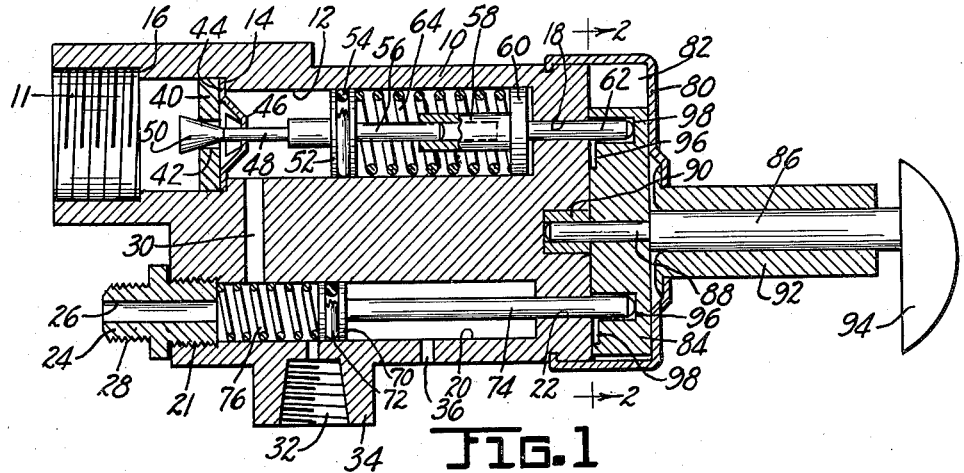
Fig. 1 is a longitudinal sectional view of one embodiment of the invention taken on line 1—1 of Fig. 2.
Figure 2:
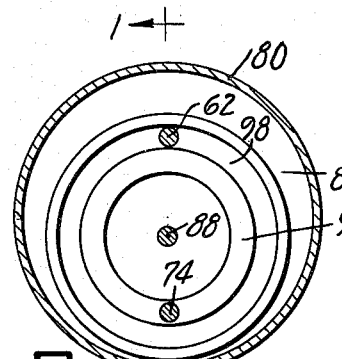
Fig. 2 is a transverse sectional view taken on line 2—2 of Fig. 1.

Referring to the drawing, and particularly to Figs. 1 to 4, I have illustrated one embodiment of the invention particularly suited and intended for use with a windshield wiper operated by compressed air and having an air pressure responsive parking device therein for positioning the blade at a predetermined location as the operating motor is shut off.

The numeral 10 designates a valve body of generally elongated character. The valve body has a plurality of spaced bores formed therein and preferably extending parallel to one another. One bore 12 is located eccentrically in the body 10 to extend longitudinally thereof and is preferably of different diameters at different portions along its length so as to provide spaced shoulders 14 and 16 therein. The inner end of the bore terminates spaced from one end of the body and preferably communicates with a reduced bore portion 18 which opens at the right-hand end of the body, as viewed in Fig. 1. A second bore 20 extends substantially parallel to and spaced from the bore 12 to open at the left-hand end of the body 10, as viewed in Fig. 1, and terminate spaced from the right-hand end of said body. A reduced bore 22 communicates with the bore 20 and extends to and opens at the right-hand end of the body. The outer ends of the bores at the left as viewed in Fig. 1, may be screw-threaded or otherwise formed, the end portion 11 of bore 12 preferably constituting an inlet, and the end portion 21 of the bore 20 preferably constituting an outlet. A fitting may be screw-threaded in each bore. Thus a fitting 24 is screw-threaded in the portion 21 of the bore 20, as viewed in Fig. 1, the same having a bore 26 therethrough and a screw-threaded outer end portion 28 for connection of a coupling therewith. The longitudinal bores, such as the bores 12 and 20, are suitably interconnected as by passages, such as the passage 30. In the form shown, the passage 30 communicates with the portion of the bore 12 inwardly of the inner shoulder 14 and communicates with the passage 20 at a point inwardly of the screw-threaded portion 21 of the bore 20. A bore 32 may communicate with one or more of the bores, such as the bore 20, and preferably is encircled by a projecting tubular hub portion 34 which is internally screw-threaded. If desired, the inner end portions of the bores, or any selected one or more thereof, may be vented to atmosphere, as at the vent port 36 communicating with the bore 20, as illustrated in Fig. 1.

The bore 12 is preferably spanned by a valve seat disk 40 having central aperture 42. Disk 40 has a snug substantially sealed fit in the intermediate portion of the bore between the shoulders 14 and 16, as shown. The marginal or annular portion 44 of a guide member 46, which preferably is in the nature of a spider offset from the valve seat engaging annulus 44, may be anchored between the valve seat 40 and the annular shoulder 14, as seen in Fig. 1. The guide 46 serves to slidably receive the stem 48 of a valve member 50 which preferably is of frusto conical shape and extends into the aperture 42 of the valve seat disk at its smaller diameter end portion so as to be adapted for a wedged sealing fit in the valve seat aperture 42. Assuming that the end portion 11 of the bore 12 is the inlet, it will be apparent that fluid pressure from the line connected with the valve will act upon the valve element 50 and serve to normally urge the same toward its seated or closed position. The valve stem 48 carries a piston member 52 which preferably is grooved and mounts a resilient annular sealing member 54, such as an O-ring formed of rubber, synthetic rubber, or the like, and of a cross-sectional size to continuously circumferentially seat in the groove of the piston and in the bore 12. A portion 56 of the valve stem projects inwardly from the piston and extends into a tubular guide portion 58 carried by a disk 60 seated in the inner end portion of the bore 12 and having a plunger 62 projecting endwise therefrom and slidably passing through the bore portion 18 to project beyond the right-hand end of the body 10 in the position of the parts shown in Fig. 1, for purposes to be described. The tip of the plunger 62 may be tapered or part-spherical. A coil spring 64 fits in the bore 12 between the piston 52 and the disk 60.

The bore 20 has a piston 70 therein provided with a groove to receive an annular resilient sealing member 72 similar to the member 54 and serving to prevent the leakage of fluid under pressure past the piston 70. An elongated plunger 74 projects from one end of the piston 70 to be slidable in the bore 22 and extend beyond the right-hand end of the body 10 in the position of the parts shown in Fig. 1. The end or tip of the plunger 74 will preferably be partly rounded or tapered, as illustrated. A coil spring 76 is preferably interposed between the fitting 24 and the piston 70 to urge the piston toward the right. Observe in this connection that the piston 70 is also urged toward the right by liquid pressure in the left-hand end of the bore 20 which communicates with the bore 12 through the passage 30.

The right-hand end of the body 10 mounts a cap 80 defining a chamber 82 within which is positioned a cam disk or plate 84. The disk 84 is mounted on a stem 86 substantially centrally thereof and having an inner projecting end portion 88 which preferably is journaled in a bearing 90 mounted in a recess in the end of the body 10. The stem 86 is preferably journaled in a sleeve 92 projecting outwardly from the cap 80. A hand grip portion 94 is mounted on the outer end of the stem 86. The axis of rotation of the stem 86 is parallel to but is spaced unequally from the projecting stem portions of the adjacent valves, such as the stem portions 62 and 74. This makes possible the provision of separate cam grooves in the inner face of the cam disk 84. Thus, where the spacing between the stem 86 and the plunger 74 is less than that between the stem 86 and the plunger 62, an annular groove 96 concentric with the stem 86 will receive the inner end of the plunger 74, and a second annular groove 98 of larger diameter will receive the inner end of the plunger 62. Observe in this connection that the grooves 96 and 98 may adjoin each other and be partially communicating is desired, although this is not necessary as the two grooves may be completely separated from each other. The contour of the cam grooves and the depth thereof is illustrated schematically in Figs. 3 and 4 wherein the base line 99 indicates the plane of the inner surface of the cam disk 84, and the spacing of the cam lines 96 and 98 from that base line indicates the depth of the groove. The orientation of the cam contours to each other is indicated by the reference letters A, B, C and D for the construction shown in Fig. 1, which assumes the provision of two valves only and the location of the cam-engaging plunger stems 62 and 74 at substantially diametrically opposed points with respect to the cam disk 84. Thus, if the cam disk 84 should be so located that the valve plunger 62 engages point D of groove 98 in Fig. 3, the plunger 74 will engage the point D of the cam groove 96 at that setting of the cam disk.

It will be apparent from the foregoing description that the location of the valve element 50 and of the valve piston 70 at any given instant will be determined by the setting of the cam disk 84, and it will further be apparent that for each angular position of the cam disk 84 both of the valves will have a selected or predetermined position. Thus it is possible that sequence of operation of both valves may be controlled accurately and simultaneously as desired by simply changing the setting of the valve stem 86 by means of the hand grip 94.

In the use of the device for the purpose of controlling the fluid pressure responsive operation of a member, such as a windshield wiper (not shown), which has a pressure responsive "parking" mechanism (not shown), a line from a pressure source will be connected to the bore 12 at the inlet 11 thereof; a line leading to the windshield wiper motor will be connected at the fitting 24; and a line leading to the "parking" mechanism will be connected at the part 34 in communication with the port 32. It will be apparent that the valve 50 is the primary valve which controls the introduction of fluid under pressure to both the windshield wiper motor and the "parking" mechanism, and that no fluid pressure is available for the operation of either of the latter when the valve 50 is closed. The closed portion of the valve 50 is at point B of Fig. 3. It will be observed that at that time the stem 74 of the valve element 70 is also located at point B in Fig. 4 and is retracted to expose the port 32 for communication with both the passage 30 leading to the bore 12 and the bore 26 of the fitting 24 leading to the windshield wiper motor. Thus any pressure which is in the system to the right of the valve element 50 and the valve seat 40 is open to or communicates through the port 32 with the "parking" mechanism and through port 26 with the wiper motor.

Figure 3:
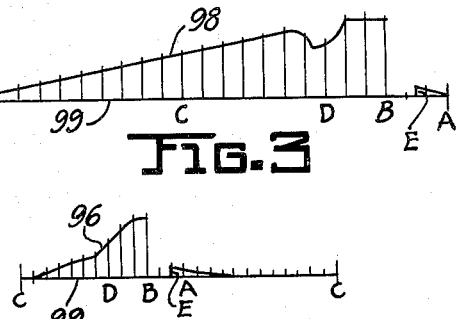
Fig. 3 is a schematic view illustrating the contour of one valve control cam.
Figure 4:
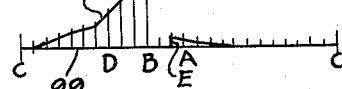
Fig. 4 is a schematic view illustrating the contour of another valve cam.

As the cam plate or disk 84 is rotated by manipulation of its hand grip member 94, movement will occur in a direction toward the left from point B, as viewed in each of Figs. 3 and 4. Thus initial movement of the cam disk from point B will entail no movement of the plunger 62 until the point D is reached, at which a sufficiently large movement of the plunger 62 occurs to insure that the valve 50 will be cracked or slightly opened despite the free play between the plunger parts 56 and 58 which is opposed by the coil spring 64. At the same time, that is, during the same arcuate movement of the valve plate from points B to D, the contact of plunger 74 with cam groove 96 causes a continuous and rapid movement of the plunger 74 to the left from the position shown in Fig. 1, so that a major portion of its stroke will occur between points B and D, and the valve element 70, 72 will pass from a position to the right of the port 32 to a position over said port or to the left of said port to substantially seal the port 32 from the passage 30 when point D is reached. The point D setting thus establishes a relationship providing for supply of fluid under pressure past valve 50 for discharge at the outlet port 26, with simultaneous closing of the port 32 by the time fluid pressure reaches the bore 20 from the inlet 11. Continued movement of the member 84 thereafter results in a restriction of the open position of the valve member 50 immediately after leaving the point D, in the case of the cam contour 98 shown in Fig. 3, followed by a progressive opening of said valve member until a full open position is reached at the point A. Thus the range of movement from point D to point A provides for regulation of the valve opening and consequent regulation of rate of flow and of rate of speed and power of the fluid-operated member connected at the fitting 24. The same movement of the disk 84 from point D to point A produces a progressive rapid further closing action of the valve member 70, 72 by cam groove 96 until the same is fully closed at position C, with the result that movement of the member 84 from point C to A will serve merely to hold the valve member 70 at a location between the passage 30 and the port 32 to prevent fluid flow to port 32. If desired, each of the cam grooves 96 and 98 may have a slight increase in depth at E adjacent point A for the purpose of enabling the operator to sense or feel that the end of the cam path has been reached. This is optional, however, and may be omitted, if desired. When this feature is provided, the device has the advantage that movement of the disk 84 from point A to point B (from right to left as viewed in Figs. 3 and 4), which would quickly return the valves to the starting position shown in Fig. 1, can be avoided, thus making certain that over-travel of the control, and resulting accidental or undesired stoppage of the wiper motor, can be averted. If an abrupt shoulder is provided, as at E, a positive limit of movement of member 84 is secured by engagement of the plungers with said shoulders.

It will be apparent from the foregoing that each of the valves 50 and 70 has a predetermined position for each angular position of the cam disk 84. Thus each of the valves is regulated accurately and in preselected flow regulating manner. The valves may be shut off completely or opened completely. Thus in the present case, the return of the cam from any position between points D and A to the point B will result in closing of the valve 50 and opening of the valve 70 to establish communication of the passages 26 and 30 with the port 32. The latter action causes operation of the unit which is connected with port 32 and bleeds fluid pressure from the unit which is connected with the fitting 24 to divert the same to actuate the first unit. As applied to a windshield wiper motor with a parking ram (not shown) connected at port 32, the positioning of the valve 70 as shown relieves the wiper motor from fluid-operating pressure and diverts that pressure to the parking ram through the port 32 for the purpose of positioning the windshield wiper blade at a "parked" or out-of-the-way position.

It will be observed that, although the position of the valve 50 is governed by the contour of the cam groove 98, it is not totally controlled thereby inasmuch as the spacing between the tip of the valve stem 62 and the outer surface of the valve element 50 is not fixed and, instead, varies according to the effectiveness of the pressure of the spring 64. This produces a cushioning action and serves somewhat as a protection for the device in the event of pressure surges which are effective upon the end of the valve 50 to exert increased pressure in a closing direction, and thus protects the pressure-operated mechanism from such surges by modulation of the valve in response to pressure variations. The spring 64 serves the additional function of assisting in the maintenance of the valve plunger 62 in engagement with the bottom of the cam groove 98 as a result of the freedom of play of the member 60 in the bore 12 as compared to the frictional fit of the sealing ring 54 of the member 52 in the bore 12. Note also that the force of the fluid pressure acts both at the end of the valve element 50 and at the piston member 52 when the valve 50 is open, to further urge the valve plunger 62 against the bottom of the cam groove 98.

A different construction exists at the valve 70, in that there can be no variation of the total length of the valve unit 70, 72, 74. Thus there is always a direct and positive spring pressure exerted by the spring 76 and acting against the valve element to push the plunger 74 against the base of the cam groove 96. It will be observed that the valve member 70 is also subject to the influence of fluid pressure within the bore 20, serving at all times cooperatively with the spring 76 to urge the valve plunger 74 against the base of the cam groove 96.

Figure 5:
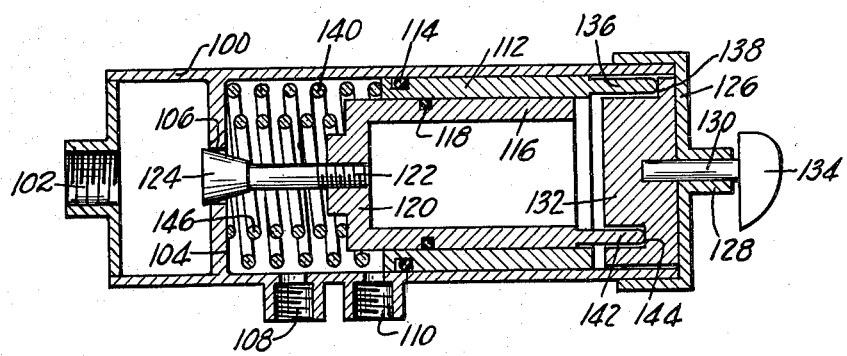
Fig. 5 is an axial sectional view of a device constituting another embodiment of the invention.

An alternate construction is illustrated in Fig. 5. In this construction the valve housing 100 has an inlet 102 at one end thereof and is spanned by an annular valve seat member 104 having a central aperture 106. An outlet 108 is formed in the housing 100 separated from the inlet 102 by the valve seat 104. A second outlet 110 is spaced longitudinally from the outlet 108.

A sleeve member 112 is slidable in the right hand end of the housing 100, as viewed in Fig. 5, and has a circumferential groove adjacent the left-hand end thereof mounting an annular resilient seal 114, such as an O-ring formed of rubber or synthetic rubber. A member 116 fits snugly and slidably within the sleeve 112 and has an annular groove therein seating an annular resilient sealing member 118 to prevent fluid flow therepast between the members 112 and 116. The member 116 is preferably cup-shaped as shown and has an end wall 120 to which is suitably secured one end of a stem 122 carrying a frusto conical valve member 124 which extends through the valve seat opening 106 and is adapted to bear in sealing relation against the valve plate in the seated position of the valve, as shown in Fig. 5.

A cap 126 is mounted on the right-hand end of the casing 100, as viewed in Fig. 5, and has a projecting neck portion 128 which serves to journal a stem or shaft 130 which mounts a valve disk or plate 132 at its inner end. A hand piece 134 is mounted on the outer end of the stem 130. The sleeve 112 has a longitudinal projection 136 which is adapted to bear against an annular cam surface 138 formed in the inner face of the member 132.

A coil spring 140 bears at one end against the valve seat member 104 and at its other end against the sleeve 112 to urge the finger 136 into engagement with the annular cam surface 138. The contour of the cam surface 138 will be such that it will move the sleeve 112 from a position as shown in Fig. 5 to a position at which its annular resilient seal 114 is interposed between the ports 108 and 110 to prevent flow of fluid under pressure to the port 110. The member 116 has a longitudinally projecting plunger 142 which bears against an annular cam surface 144 in the nature of a groove formed in the inner face of the cam member 132. A coil spring 146 may be provided, bearing at one end against the member 104 and at the other end against the end wall 120 of the member carrying the valve 124, thereby serving to urge the valve 124 toward closed position and to urge the plunger 142 against the bottom of the cam groove 144.

It will be observed that in this construction, since the members 112 and 116 are concentric, the cam shaft 130 will be concentric therewith and the cam grooves 138 and 144 will likewise be concentric therewith. The cam grooves will be of any selected contour to cause positive control of the position of each of the members 112 and 116 for each rotative adjustment of the member 132. Thus this device provides, by a slightly different construction, for operation in the same manner and for accomplishment of the same advantages and functions explained above with reference to the embodiment shown in Fig. 1, including the use of fluid pressure to normally urge the valve 124 toward closed position and to normally urge the member 112 toward open position, the provision for conjoint operation of both valve members, and the provision of any selected pattern or sequence of operation of the valves.

While the preferred embodiments of the invention have been illustrated and described, it will be understood that changes in the construction may be made within the scope of the appended claims without departing from the spirit of the invention.

I claim:

1. A sequence controller for valves comprising a housing having an inlet and a pair of spaced outlets, a valve seat interposed between said inlet and said outlets, a valve element shiftable relative to said valve seat between open and closed positions, a second valve element shiftable in said housing between a closed position interposed between said outlets and an open position permitting flow between said outlets, said valve elements being shiftable in substantially parallel laterally spaced paths and each having a plunger, and a member rotatably carried by said housing and having a pair of cam surfaces each engaged by one of said plungers, said cam member actuating said valves in selected sequence and simultaneously actuating said valves during a part of its rotative movement, said first valve having a longitudinally shiftable telescoping connection with its plunger, and spring means normally urging said first valve to longitudinally extended position relative to its plunger.

2. A sequence controller for valves comprising a valve housing having inlet and outlet means to accommodate a plurality of flow paths, a valve seat interposed in one flow path, a shiftable valve unit adapted to engage said valve seat, a second shiftable valve unit controlling flow in another path, and a cam member carried by said housing and having a pair of contoured surface portions each engaged by a portion of a valve member, said cam member being shiftable in a path transverse of the paths of said valve members to shift said valves in predetermined sequence and at different rates and to simultaneously shift said valves during a portion of the movement of said cam member, said first valve including a pressure responsive valve element adapted to sealingly engage said valve seat, a cam follower, and a coil spring interposed between said valve element and cam follower.

3. A sequence controller for valves comprising a valve housing having inlet and outlet means to accommodate a plurality of flow paths, a valve seat interposed in one flow path, a shiftable valve unit adapted to engage said valve seat, a second shiftable valve unit controlling flow in another path, and a cam member carried by said housing and having a pair of contoured cam surface portions each engaged by a portion of a valve unit and shiftable in a path transverse of the paths of said valve units, said first valve unit including a pressure responsive valve element adapted to sealingly engage said valve seat, a second pressure responsive element fixedly connected with said first valve element and positioned at the side of said valve seat opposite said first valve element, a cam follower shiftable relative to said second pressure responsive element and engaging said cam member, and a coil spring interposed between said second pressure responsive element and said cam follower to normally urge the same in opposite directions.

4. A sequence controller for valves comprising a housing having an inlet and a pair of spaced outlets, a valve seat interposed between said inlet and said outlets, a valve element shiftable relative to said valve seat between open and closed positions, a second valve element shiftable in said housing between a closed position interposed between said outlets and an open position permitting flow between said outlets, said valve elements being shiftable in substantially parallel paths and each having a plunger, and a member rotatably carried by said housing and having a pair of annular cam surfaces each engaged by a plunger, said cam surfaces actuating said plungers at different rates in selected sequence and simultaneously actuating said plungers in selected rotative positions, said housing having spaced longitudinal bores, said inlet and valve seat being located at one bore, a passage connecting said bores and located inwardly of said valve seat and communicating with the other bore between said outlets, said second valve being located in said second bore and having a closed position between one outlet and said passage.

References Cited in the file of this patent

UNITED STATES PATENTS

| | | |
|---|---|---|
| 1,690,767 | Block | Nov. 6, 1928 |
| 2,132,766 | Stroup | Oct. 11, 1938 |
| 2,661,765 | Troy | Dec. 8, 1953 |
| 2,354,960 | Morehouse | Aug. 1, 1954 |
| 2,714,207 | Lindstrom | Aug. 2, 1955 |